US012500486B2

United States Patent
Itagaki (10) Patent No.: US 12,500,486 B2
(45) Date of Patent: Dec. 16, 2025

(54) ELECTRIC POWER TOOL

(71) Applicant: MAX CO., LTD., Tokyo (JP)

(72) Inventor: Osamu Itagaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 248 days.

(21) Appl. No.: 18/131,945

(22) Filed: Apr. 7, 2023

(65) Prior Publication Data

US 2023/0327526 A1 Oct. 12, 2023

(30) Foreign Application Priority Data

Apr. 8, 2022 (JP) ................................. 2022-064775

(51) Int. Cl.
| | |
|---|---|
| *H02K 11/33* | (2016.01) |
| *B25F 5/02* | (2006.01) |
| *E04G 21/12* | (2006.01) |
| *H02K 7/14* | (2006.01) |
| *H02K 11/35* | (2016.01) |

(52) U.S. Cl.
CPC ............... *H02K 11/33* (2016.01); *B25F 5/02* (2013.01); *E04G 21/123* (2013.01); *H02K 7/145* (2013.01); *H02K 11/35* (2016.01); *H02K 2211/03* (2013.01)

(58) Field of Classification Search
CPC .......... H02K 11/33; H02K 7/14; H02K 7/145; H02K 11/35; H02K 2211/03; B25F 5/02; B25F 1/00; E04G 21/123
See application file for complete search history.

(56) References Cited

U.S. PATENT DOCUMENTS

| | | | |
|---|---|---|---|
| 6,275,192 B1 * | 8/2001 | Kim | ....................... H01Q 9/285 |
| | | | 343/831 |
| 2004/0018814 A1 * | 1/2004 | Lin | ....................... H05K 1/0237 |
| | | | 455/73 |
| 2014/0085144 A1 | 3/2014 | Krapf et al. | |
| 2016/0005295 A1 | 1/2016 | Keda et al. | |
| | | (Continued) | |

FOREIGN PATENT DOCUMENTS

| | | |
|---|---|---|
| CN | 211193757 U | 8/2020 |
| DE | 212018000199 U1 | 12/2019 |
| | (Continued) | |

OTHER PUBLICATIONS

English translation of WO-2020-174603-A1 (Year: 2020).*
Extended European Search Report for EP Application No. 23167374.0 dated Aug. 21, 2023. (7 pp).

*Primary Examiner* — Tulsidas C Patel
*Assistant Examiner* — Joshua Kiel M Rodriguez
(74) *Attorney, Agent, or Firm* — Banner & Witcoff, Ltd.

(57) ABSTRACT

There is provided an electric power tool including: a first electric motor and a second electric motor; a first controller configured to control the first electric motor and the second electric motor; a first circuit board on which the first controller is mounted; a communication device; a second controller configured to control the communication device; a second circuit board on which the second controller and an antenna of the communication device are mounted; and a housing configured to accommodate the first electric motor, the second electric motor, the first circuit board, the communication device, and the second circuit board. The first circuit board and the second circuit board are disposed around the first electric motor.

12 Claims, 7 Drawing Sheets

(56) References Cited

U.S. PATENT DOCUMENTS

| | | | |
|---|---|---|---|
| 2019/0190164 A1 | 6/2019 | Yoshikawa et al. | |
| 2019/0257097 A1* | 8/2019 | Kawai et al. | |
| 2020/0133229 A1* | 4/2020 | Girt | B25F 5/00 |
| 2020/0376645 A1* | 12/2020 | Davis | B25F 5/02 |
| 2022/0154479 A1 | 5/2022 | Mito | |

FOREIGN PATENT DOCUMENTS

| | | |
|---|---|---|
| EP | 1777360 A1 | 4/2007 |
| JP | 2016-013588 A | 1/2016 |
| JP | 2018037915 A | 3/2018 |
| JP | 2020023026 A | 2/2020 |
| JP | 2020163568 A | 10/2020 |
| JP | 2022033911 A | 3/2022 |
| WO | 2020-174603 A1 | 9/2020 |

\* cited by examiner

ELECTRIC POWER TOOL

CROSS-REFERENCE TO RELATED APPLICATIONS

This application is based on Japanese Patent Application No. 2022-064775 filed on Apr. 8, 2022, the contents of which are incorporated herein by way of reference.

TECHNICAL FIELD

The present invention relates to an electric power tool.

BACKGROUND ART

In recent years, there is an electric power tool improved in convenience by being mounted with a wireless communication device on a main body of the electric power tool. Patent Literature 1 discloses such an electric power tool on which a wireless communication device can be mounted. The electric power tool includes an electric motor, a communication device, and a detachable battery.

Patent Literature 1: JP2016-13588A

However, in the electric power tool of Patent Literature 1, since the communication device is provided on the battery, the battery is increased in weight and the entire electric power tool is increased in height. In particular, in an electric power tool equipped with a plurality of electric motors, a large-capacity battery is used. Due to provision of a communication device, the battery is further increased in weight, and the entire electric power tool is greatly increased in height, resulting in poor operability.

Therefore, an object of the present invention is to provide an electric power tool on which a wireless communication device and a plurality of electric motors can be mounted and in which a weight of a battery and a height of the electric power tool can be reduced.

SUMMARY OF INVENTION

There is provided an electric power tool including: a first electric motor and a second electric motor; a first controller configured to control the first electric motor and the second electric motor; a first circuit board on which the first controller is mounted; a communication device; a second controller configured to control the communication device; a second circuit board on which the second controller and an antenna of the communication device are mounted; and a housing configured to accommodate the first electric motor, the second electric motor, the first circuit board, the communication device, and the second circuit board. The first circuit board and the second circuit board are disposed around the first electric motor.

Here, the communication device may include a communication portion configured to wirelessly transmit information to and receive information from an external device.

The "electric power tool" of the present invention refers to a tool that uses electricity as a power source and that is used for work such as machining. The "electric power tool" of the present invention includes, in addition to a product used alone, a component or a module that constitutes a part of another device. For example, the "electric power tool" of the present invention may be a module attached to equipment of a robot arm. Further, the "electric power tool" of the present invention may be a component constituting a part of a machine tool having a plurality of functions.

DESCRIPTION OF EMBODIMENTS

Hereinafter, embodiments of the present invention will be described with reference to the drawings. The following embodiments are examples for explaining the present invention, and it is not intended to limit the present invention only to the embodiments.

Figure 2:
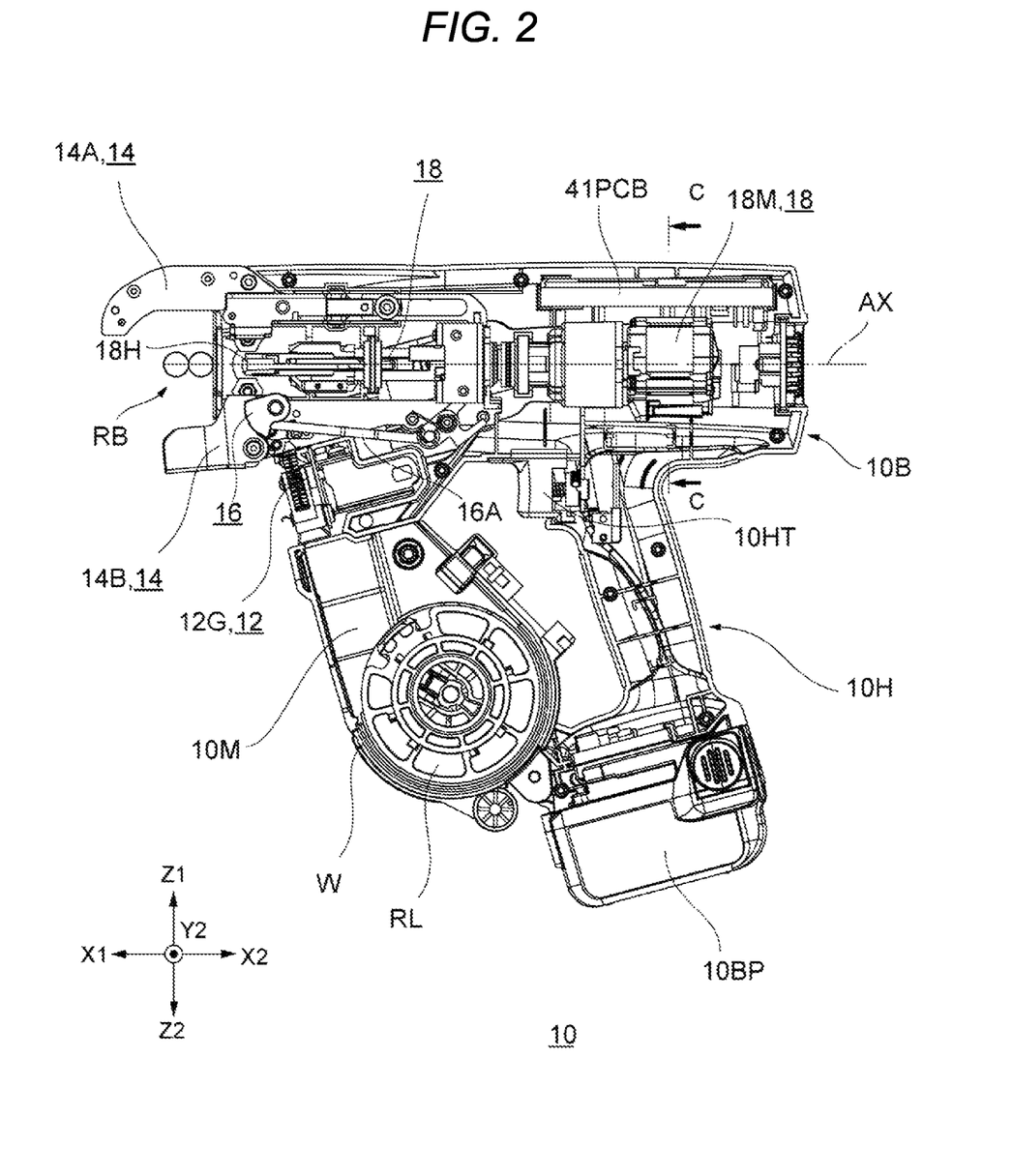
FIG. 2 is a cross-sectional view of the electric power tool according to the embodiment.

For the sake of convenience, a left-right direction of the paper surface of FIG. 2 may be referred to as a front-rear direction X (an example of a "first direction"), and in particular, a left direction of the paper surface may be referred to as a front side X1 and a right direction of the paper surface may be referred to as a rear side X2; an up-down direction of the paper surface may be referred to as an up-down direction Z (an example of a "second direction"), and in particular, an upper direction of the paper surface may be referred to as an upper side Z1 and a lower direction of the paper surface may be referred to as a lower side Z2; a direction perpendicular to the front-rear direction X and the up-down direction Z may be referred to as a right-left direction Y (an example of a "third direction"), and in particular, a right direction may be referred to as a right side Y1 and a left direction may be referred to as a left side Y2 when facing the front side X1. This is used for the purpose of describing a relative direction relationship, and does not indicate an absolute direction.

Figure 1:
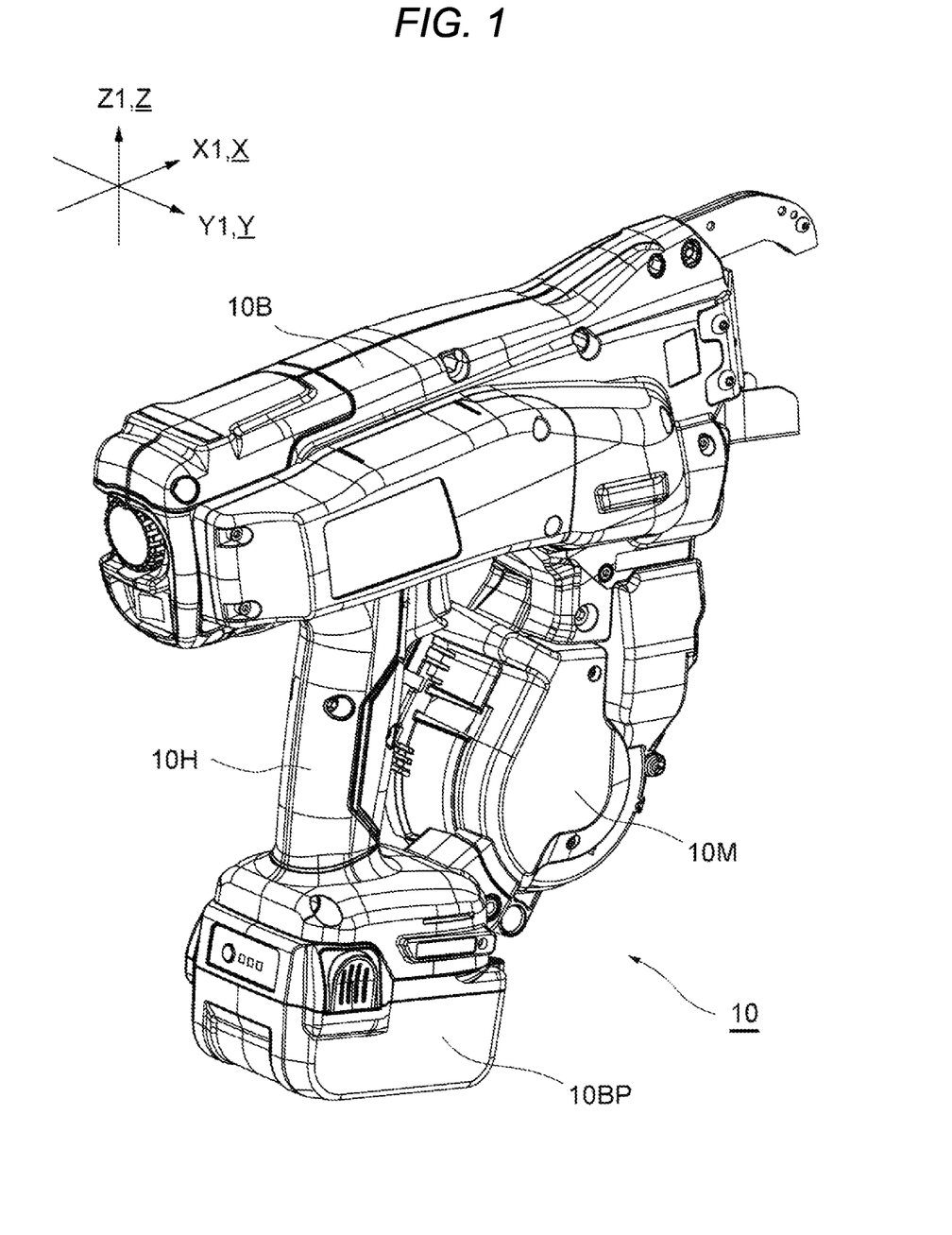
FIG. 1 is a perspective view of an electric power tool according to an embodiment.

Hereinafter, an embodiment in which the present invention is applied to a reinforcing bar binding machine that is an electric power tool will be described. FIG. 1 is a perspective view of a reinforcing bar binding machine 10 that is an electric power tool according to the present embodiment. FIG. 2 is a cross-sectional view obtained by cutting the reinforcing bar binding machine 10, which is the electric power tool, along a cross section perpendicular to the left-right direction Y.

The present invention can be widely applied to an electric power tool that has a communication function and performs work using an electric motor (motor), and can be applied to, for example, a drill, an impact driver, a nailer, a grinder, a reciprocating saw, and a polisher. The motor may be a brushless motor or a motor with brush.

[Basic Configuration of Electric Power Tool]

The reinforcing bar binding machine 10 according to the present embodiment is configured to bind two reinforcing bars RB or three or more reinforcing bars RB by feeding a wire W outward from an end thereof at the front side X1.

Specifically, the reinforcing bar binding machine 10 includes: a handle 10H to be gripped by a worker; a magazine 10M for accommodating the wire W; a wire feeding portion 12 for feeding the wire W outward from the end at the front side X1; a curl forming portion 14 constituting a traveling path of the wire W for winding the wire W around the reinforcing bar RB; a cutting portion 16 for cutting the wire W wound around the reinforcing bar RB; a binding portion 18 for twisting the wire W wound around the reinforcing bar RB; a tool controller including a drive controller 22 for controlling both a feeding motor 12M (an example of a "second electric motor") and a binding motor 18M (an example of a "first electric motor") that are provided in the wire feeding portion 12 and the binding portion 18, respectively; a communication portion 30 that includes a communication device 32 for the reinforcing bar binding machine 10 to communicate with the outside, and a communication controller 34 for controlling the communication device 32; and a housing 10C constituting an exterior of the reinforcing bar binding machine 10 and configured to accommodate at least two electric motors (the feeding motor 12M and the binding motor 18M in the present embodiment), the drive controller 22, the communication device 32 and the communication controller 34.

In the reinforcing bar binding machine 10 of the present embodiment, the curl forming portion 14, the cutting portion 16, the binding portion 18, the tool controller, and the communication portion 30 constitute a main body 10B of the reinforcing bar binding machine 10. The magazine 10M is provided extending from a lower portion of the main body 10B at the front side X1 to the lower side Z2. The handle 10H is provided extending from a lower portion of the main body 10B at the rear side X2 to the lower side Z2. Thus, the magazine 10M is provided at the front side X1 with respect to the handle 10H, and the handle 10H is provided at the rear side X2 with respect to the magazine 10M. Further, a lower portion of the magazine 10M and a lower portion of the handle 10H are connected to each other. Hereinafter, the configurations will be described.

The reinforcing bar binding machine 10 includes the handle 10H that extends from the main body 10B to the lower side Z2. The handle 10H corresponds to a portion for a worker to grip the reinforcing bar binding machine 10. A lower end of the handle 10H is formed such that a main battery 10BP can be detachably attached thereto. A trigger 10HT is provided on a surface of the handle 10H facing the front side X1. The reinforcing bar binding machine 10 is configured such that, when the worker presses the trigger 10HT toward the rear side X2, the tool controller starts a control operation to start a binding operation as will be described later.

In the magazine 10M, a reel RL around which the linear wire W is wound is rotatably and detachably housed. Here, the reel RL is configured to feed one wire W or to simultaneously feed a plurality of wires W. The wire W is a linear body suitable for binding the reinforcing bar RB, such as a long metal wire having flexibility (including a coated metal wire).

The wire feeding portion 12 includes a pair of gears 12G configured to advance the wire W by rotating in different directions from each other with the wire W sandwiched therebetween, and the feeding motor 12M configured to drive the gears 12G. The feeding motor 12M includes a rotor and a stator. The wire feeding portion 12 is configured to feed the wire W outward by rotating the rotor of the feeding motor 12M in a forward direction and configured to pull back the wire W by rotating the rotor in a reverse direction. The tool controller that controls the feeding motor 12M of the wire feeding portion 12 will be described later.

The curl forming portion 14 includes a curl guide 14A configured to curve and curl the wire W fed by the wire feeding portion 12, and an introducing guide 14B configured to introduce the wire W curled by the curl guide 14A to the binding portion 18. The curl guide 14A is configured to curve the wire W into a loop shape by advancing the wire W along an inner wall surface. Therefore, when the wire W is fed in a state where a plurality of reinforcing bars RB are arranged extending in the left-right direction Y in a space between the curl guide 14A and the introducing guide 14B, it is possible to wind the wire W around the reinforcing bars RB.

The cutting portion 16 includes a fixed blade, a movable blade that cuts the wire W in cooperation with the fixed blade, and a transmission mechanism 16A that transmits an operation of the binding portion 18 to the movable blade. The cutting portion 16 is configured to cut the wire W by a rotational operation of the movable blade with the fixed blade serving as a fulcrum shaft. The transmission mechanism 16A is configured to transmit the operation of the binding portion 18 to the movable blade and configured to rotate the movable blade in conjunction with a binding operation of the binding portion 18. Therefore, the transmission mechanism 16A rotates the movable blade in conjunction with the operation of the binding portion 18, whereby the wire W can be cut at a predetermined timing as will be described later.

The binding portion 18 includes a pair of hooks 18H configured to be openable and closable in order to clamp the wire W, a rotary shaft for rotating the pair of hooks 18H with the front-rear direction X as a rotation axis, a speed reducer configured to move the rotary shaft in a rotation axis direction (front-rear direction X) and configured to rotate the rotary shaft moved to the front side X1, and the binding motor 18M configured to be rotatable about a rotation axis AX.

The rotary shaft of the binding portion 18 rotates in a forward direction when the binding motor 18M rotates in a forward direction. A sliding portion is provided around the rotary shaft, and the sliding portion is configured to move toward the front side X1 when the rotary shaft rotates in the forward direction. The wire W fed by the feeding motor 12M in a state where the pair of hooks 18H are opened proceeds while being curved along inner wall surfaces of the curl guide 14A and the introducing guide 14B, and a leading end of the wire W passes through a gap between the pair of hooks 18H that are opened. In this state, when the binding motor 18M rotates in the forward direction and the rotary shaft rotates in the forward direction, the sliding portion moves to the front side X1 and the pair of hooks 18H are closed. Therefore, the pair of hooks 18H can clamp the wire W. When the binding motor 18M further rotates in the forward direction and the rotary shaft rotates in the forward direction to move the sliding portion to the front side X1, the movable blade is rotated by the transmission mechanism 16A to cut the wire W. When the binding motor 18M further rotates in the forward direction, the binding portion 18 bends the leading end of the cut wire W in a state where the wire W is clamped by the pair of hooks 18H. When the binding motor 18M further rotates in the forward direction, the rotary shaft rotates together with the sliding portion with the front-rear direction X as a rotation axis. The rotary shaft rotates in the state where the wire W is clamped by the pair of hooks 18H, whereby the pair of hooks 18H twist the wire W.

[Electric Circuit Configuration of Electric Power Tool]

Figure 3:
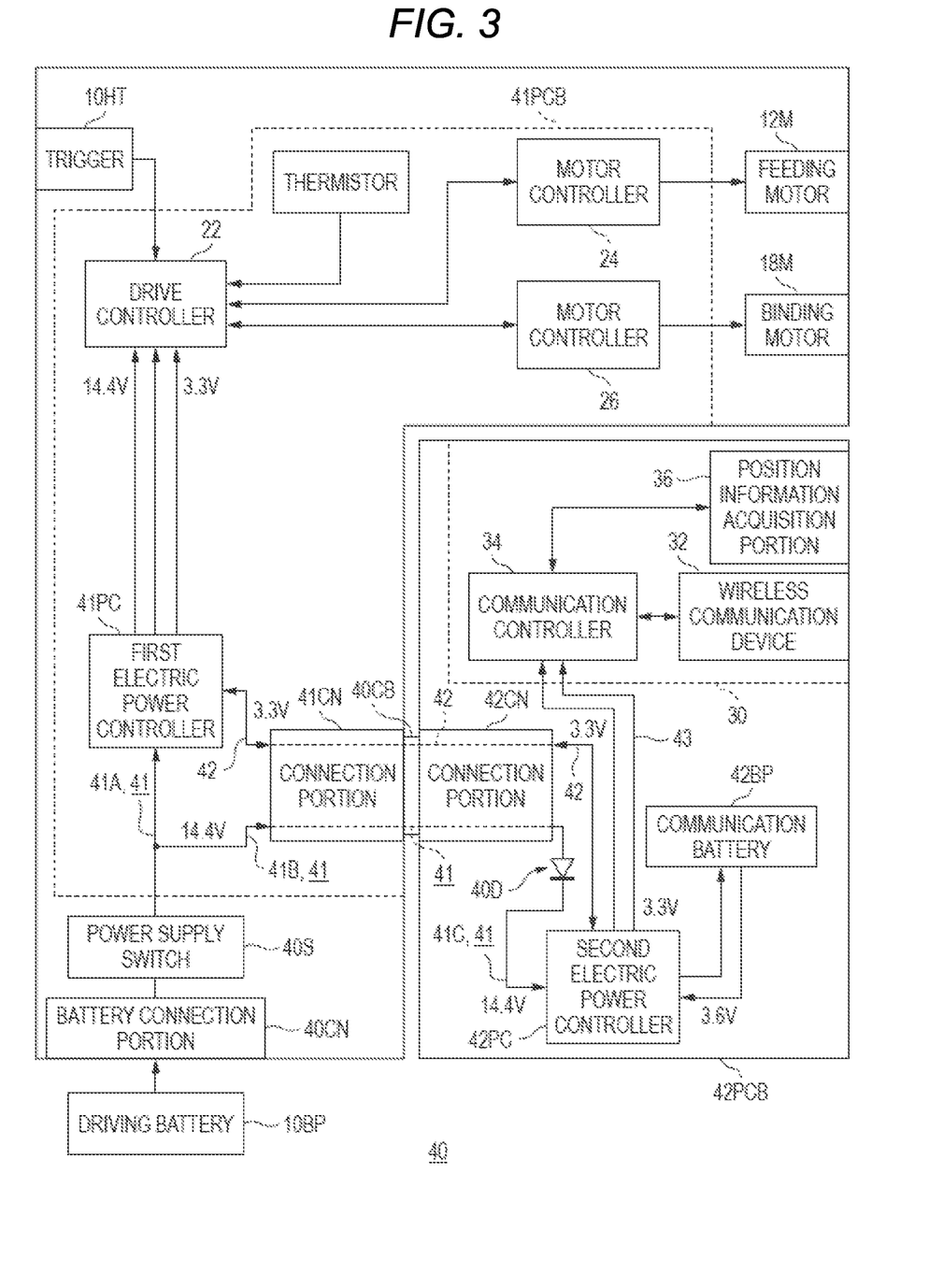
FIG. 3 is a block diagram illustrating an electric circuit configuration of the electric power tool according to the embodiment.

FIG. 3 is a block diagram illustrating an electric circuit configuration of the reinforcing bar binding machine 10 according to the present embodiment. In the electric circuit configuration of the reinforcing bar binding machine 10, a configuration for controlling the feeding motor 12M, a configuration for controlling the communication device 32, and a configuration for supplying electric power (voltage) to these configurations constitute a power supply device 40 of the present embodiment.

Specifically, the power supply device 40 according to the present embodiment includes: a battery connection portion 40CN for receiving supply of electric power (voltage) from the battery 10BP (which may be referred to as a "driving battery" or a "first battery"); a power supply switch 40S for turning on or off supply of electric power (voltage) supplied from the battery connection portion 40CN; a first electric power controller 41PC (an example of a "first voltage supply portion") that receives supply of electric power (voltage) from the battery 10BP via the power supply switch 40S and that supplies, based on a first power supply voltage supplied from the battery 10BP, a first operating voltage for operating the drive controller 22 (an example of a "first controller"); the drive controller 22 that operates based on the first operating voltage and that generates a control signal for controlling the feeding motor 12M; and a motor controller 24 that controls a current flowing through the stator of the feeding motor 12M based on the control signal generated by the drive controller 22.

The battery 10BP is configured to supply electric power for operating at least the drive controller 22, the motor controller 24, the feeding motor 12M, the binding motor 18M, the communication controller 34, a wireless communication device 32, and a position information acquisition portion 36, the last three of which are to be described later. The battery 10BP is, for example, a rechargeable lithium ion secondary battery, and has a predetermined rated capacity, rated voltage, and rated current. For example, the battery 10BP has a rated capacity of 5.0 Ah, and is configured to supply a DC voltage having a rated value of 14.4 V. However, as will be described later, the DC voltage supplied from the battery 10BP decreases gradually accompanying power consumption of the battery 10BP.

The battery connection portion 40CN receives supply of the DC voltage from the battery 10BP and supplies the DC voltage to the first electric power controller 41PC. The power supply device 40 includes a first voltage line 41 that connects the battery connection portion 40CN and the first electric power controller 41PC, and the first power supply voltage of DC supplied from the battery 10BP is applied to the first voltage line 41.

According to an operation of a main power supply switch (not illustrated) of the reinforcing bar binding machine 10, the power supply switch 40S turns on or off the supply of electric power (voltage) that is supplied from the battery 10BP to the first electric power controller 41PC via the battery connection portion 40CN. Specifically, when a worker turns off the main power supply switch, the power supply switch 40S cuts off (turns off) the supply of electric power (voltage) from the battery 10BP to the first electric power controller 41PC, and when the worker turns on the main power supply switch, the power supply switch 40S permits (turns on) the supply of electric power (voltage) from the battery 10BP to the first electric power controller 41PC.

The first electric power controller 41PC generates, based on the first power supply voltage supplied from the battery 10BP, a voltage for operating circuit elements including the drive controller 22, and supplies the voltage to the circuit elements and the like. The first electric power controller 41PC (first voltage supply portion) is, for example, a circuit. For example, the first electric power controller 41PC is configured to generate, based on the first power supply voltage of 14.4 V supplied from the battery 10BP, a voltage of 3.3 V (an example of a "first operating voltage") that is an operating voltage of the drive controller 22, and configured to supply the voltage of 3.3 V to the drive controller 22, and configured to further supply the first power supply voltage (14.4 V) to the motor controller 24, a motor controller 26 and stators of respective motors. Here, supplying a voltage includes generating and supplying a voltage, and passing through and supplying a voltage without generating the voltage. The first electric power controller 41PC is configured to further generate an intermediate voltage higher than the first operating voltage and lower than the first power supply voltage and configured to supply the intermediate voltage to a different circuit element. The first electric power controller 41PC may include a booster circuit that is configured to generate a voltage higher than the first power supply voltage and configured to supply the generated voltage to a different circuit element.

The drive controller 22 operates based on a voltage of 3.3 V, for example, to generate a control signal for controlling the feeding motor 12M and supplies the control signal to the motor controller 24. The drive controller 22 is configured to control other actuators and the like of the reinforcing bar binding machine 10. Further, the drive controller 22 supplies, to (for example, a positive power supply line of) the motor controller 24, the first power supply voltage supplied from the first electric power controller 41 PC. The drive controller 22 is further configured to receive a signal detecting that the trigger 10HT is pressed, and configured to start a motor control operation based on the signal. In addition, the drive controller 22 may be configured to receive a signal indicating a temperature of the electric power tool (reinforcing bar binding machine 10) from a thermistor and configured to control the feeding motor 12M based on the signal. For example, the drive controller 22 may generate different control signals in cases of a relatively high temperature and a relatively low temperature of the electric power tool and may supply the control signals to the motor controller 24.

The drive controller 22 may include a single or a plurality of processors implemented by an integrated circuit (IC), and a memory (including a non-volatile semiconductor memory that stores information in a non-transitory manner) storing firmware that is executed by the processor and that includes a computer command for executing various types of processing described in the present embodiment. The drive controller 22 (first controller) is, for example, a circuit. The drive controller 22 may be implemented by an IC such as an ASIC, an FPGA, a microcontroller, or the like. The drive controller 22 also functions as a part of the tool controller.

The motor controller 24 controls a current flowing through the stator of the feeding motor 12M based on a control signal generated by the drive controller 22. For example, the motor controller 24 may include a plurality of (for example, six) semiconductor elements connected in a three-phase bridge manner between a positive power supply line and a negative power supply line of a ground (reference potential), and a driver circuit for generating and supplying a gate signal (or a base signal) to a gate (or a base) of each semiconductor element.

The feeding motor 12M, which is an electric motor according to the present embodiment, includes, for example, a stator including three-phase windings connected to three-phase outputs of the motor controller 24, and a rotor configured to be rotatable in both forward and reverse directions according to a rotating magnetic field generated by a current flowing through the windings of the stator. The feeding motor 12M may further include, for example, a Hall element for detecting a position of the rotor, and the drive controller 22 may be configured to receive a position signal from the Hall element and configured to generate a control signal based on the position signal.

Similarly, although a detailed description is omitted, the power supply device 40 includes, for the binding motor 18M, a drive controller that generates a control signal for controlling the binding motor 18M and that supplies the control signal to the motor controller 26 of the binding motor 18M, and the motor controller 26 that controls a current flowing through the stator of the binding motor 18M based on the control signal generated by the drive controller. The drive controller of the binding motor 18M and the drive controller 22 of the feeding motor 12M may be provided in the same semiconductor chip.

The power supply device 40 further includes a first circuit board 41PCB on which at least the first electric power controller 41PC, the drive controller 22, the motor controller 24, and the motor controller 26 are mounted. The first circuit board 41PCB is provided with a first connection portion 41CN (an example of a "first connector") for connecting to a second circuit board 42PCB described later via a cable 40CB. As illustrated in FIG. 3, the first voltage line 41 includes a first wiring 41A connecting the battery connection portion 40CN and the first electric power controller 41PC, and a second wiring 41B branching from the first wiring 41A and connected to the first connection portion 41CN. The power supply device 40 further includes a second voltage line 42 to which the first operating voltage (3.3 V) generated by the first electric power controller 41PC can be applied and that connects the first electric power controller 41PC and the first connection portion 41CN. The first circuit board 41PCB in FIG. 3 is drawn conceptually, and the actual first circuit board 41PCB is formed in a rectangular shape having two parallel long edges and two parallel short edges connecting ends of the long edges.

With the above configuration, it is possible to supply electric power for implementing the functions of the electric power tool. Next, a configuration related to a communication function of the electric power tool will be described.

As illustrated in FIG. 3, the power supply device 40 includes: a second battery 42BP for communication (also may be referred to as a "communication battery"); a second electric power controller 42PC (an example of a "second voltage supply portion") that is configured to supply, based on the first power supply voltage supplied from the main battery 10BP, a second operating voltage for operating the communication controller 34 (an example of a "second controller"), and that is configured to supply, based on a second power supply voltage supplied from the second battery 42BP in cases such as one where the main battery 10BP is removed, the second operating voltage for operating the communication controller 34; and the communication controller 34 that controls the wireless communication device 32 (an example of the "communication device 32") and the position information acquisition portion 36 based on the second operating voltage supplied from the second electric power controller 42PC.

The communication portion 30 of the electric power tool includes the position information acquisition portion 36 that acquires position information of the electric power tool and that supplies the position information to the communication controller 34, and the wireless communication device 32 for wirelessly transmitting information to and receiving information from an external device.

The position information acquisition portion 36 includes, for example, an antenna configured to receive a signal from a positioning satellite of GPS (or another GNSS such as GLONASS), and a reception circuit that acquires position information of the electric power tool based on the signal received by the antenna.

For example, the wireless communication device 32 includes: an antenna 32A (FIG. 7) that is configured to transmit information to and receive information from a remote base station according to a predetermined standard by using a frequency band of a licensed band or an unlicensed band based on the LPWA technology; an RFIC that is configured to demodulate an analog signal received by the antenna 32A and configured to supply the demodulated analog signal to a baseband IC, and that is configured to modulate a signal supplied from the baseband IC into an analog signal and configured to transmit the analog signal from the antenna 32A; and the baseband IC that decodes or encodes a signal acquired from the RFIC according to a protocol defined by the standard and that transmits and receives information. The communication device 32 may be compatible with a short-distance wireless communication system such as Bluetooth (registered trademark) or a wireless LAN.

With the above-described configuration, for example, the communication controller 34 is configured to provide the position information of the electric power tool to the outside by transmitting, via the wireless communication device 32, the position information acquired by the position information acquisition portion 36. The communication controller 34 (second controller) is, for example, a circuit. In the present embodiment, the communication controller 34, the RFIC, and the baseband IC may be stacked in the same semiconductor package. The communication controller 34 and the baseband IC may be formed of the same semiconductor chip.

The power supply device 40 further includes the second circuit board 42PCB on which at least the second electric power controller 42PC, the communication controller 34, the communication device 32, and the position information acquisition portion 36 are mounted. The second circuit board 42PCB is provided with a second connection portion 42CN (an example of a "second connector") for connecting to the first circuit board 41PCB via the cable 40CB. As illustrated in FIG. 3, with respect to the first voltage line 41, the first wiring 41A and the second wiring 41B are formed on the first circuit board 41PCB, and a third wiring 41C electrically connected to the first wiring 41A and the second wiring 41B via the connectors is formed on the second circuit board 42PCB. With respect to the second voltage line 42, a wiring connecting the first connection portion 41CN and the first electric power controller 41PC is formed on the first circuit board 41PCB, and a wiring electrically connected to the former wiring via the connectors and connected to the second electric power controller 42PC is formed on the second circuit board 42PCB.

The second battery 42BP further provided in the power supply device 40 supplies electric power for operating at least the communication controller 34, the wireless communication device 32, and the position information acquisition portion 36. The second battery 42BP is, for example, a rechargeable lithium ion secondary battery, and has a predetermined rated capacity, rated voltage, and rated current.

For example, the second battery 42BP has a rated capacity smaller than that of the main battery 10BP, and is configured to supply a DC voltage having a rated value of 3.6 V (an example of a "second power supply voltage"). In addition, since the second battery 42BP is housed in the housing 10C constituting the main body 10B of the electric power tool, unlike the main battery 10BP, the second battery 42BP is not provided to be easily detachable but is integrally fixed to the second circuit board 42PCB. The second battery 42BP may not be integrally fixed to the second circuit board 42PCB, and may be detachably provided with respect to the second circuit board 42PCB, for example.

The second electric power controller 42PC is configured to generate, based on a power supply voltage supplied from the battery 10BP, a voltage for operating circuit elements including the communication controller 34 and the drive controller 22, and configured to supply the voltage to the circuit elements and the like. The second electric power controller 42PC (second voltage supply portion) is, for example, a circuit. For example, the second electric power controller 42PC generates, based on a power supply voltage of 14.4 V supplied from the battery 10BP, a voltage (an example of the "second operating voltage") of 3.3 V that is an operating voltage of the communication controller 34, and supplies the voltage to the communication controller 34 by a third voltage line 43 connecting the second electric power controller 42PC and the communication controller 34, and similarly, generates a predetermined operating voltage and supplies the predetermined operating voltage to the position information acquisition portion 36 and the wireless communication device 32.

In addition, the second electric power controller 42PC is configured to generate, based on a DC voltage of 3.6 V corresponding to the second power supply voltage supplied from the second battery 42BP, an operating voltage for operating circuit elements and the like, and configured to supply the generated operating voltage to the circuit elements including the communication controller 34 and the drive controller 22. Here, the second electric power controller 42PC includes a booster circuit that is configured to generate a voltage higher than the second power supply voltage in order to operate the antenna 32A. However, the reinforcing bar binding machine 10 may not necessarily include the booster circuit. In the present embodiment, since the operating voltage of the antenna is higher than the second power supply voltage, the reinforcing bar binding machine 10 includes a booster circuit such as a charge pump circuit. However, for example, when a circuit element to be driven by electric power of the second battery 42BP is selected or when the second power supply voltage is set such that an operating voltage of the circuit element is equal to or lower than the second power supply voltage, the reinforcing bar binding machine 10 may not necessarily include the booster circuit.

With the above configuration, when the main battery 10BP is removed, the second electric power controller 42PC operates the drive controller 22, the communication controller 34, the position information acquisition portion 36, and the wireless communication device 32 based on the second power supply voltage supplied from the second battery 42BP, thereby enabling wireless transmission and reception of information with an external device. Accordingly, even when the main battery 10BP is removed, the communication controller 34 can provide the position information of the electric power tool to the external device by transmitting, via the wireless communication device 32, the position information acquired by the position information acquisition portion 36, and can store update data for updating the firmware of the drive controller 22 that is received via the wireless communication device 32 in, for example, a non-volatile semiconductor memory constituting the drive controller 22.

Further, the second electric power controller 42PC is configured to generate, based on the power supply voltage supplied from the main battery 10BP, a charging voltage for charging the second battery 42BP, and configured to charge the second battery 42BP. Accordingly, when the battery 10BP is attached, the power supply device 40 according to the present embodiment is configured to operate the drive controller 22, the motor controller 24, the motor controller 26, the motors (the feeding motor 12M and the binding motor 18M), the communication controller 34, the position information acquisition portion 36, and the wireless communication device 32 based on electric power supplied from the battery 10BP, and is configured to charge the second battery 42BP based on electric power supplied from the battery 10BP. When the main battery 10BP is removed, the power supply device 40 is configured to operate the drive controller 22, the communication controller 34, the position information acquisition portion 36, and the wireless communication device 32 based on electric power supplied from the second battery 42BP. As described above, since supplying a voltage includes passing through and supplying a voltage without generating the voltage, a voltage serving as a power supply may be supplied to the communication controller 34 and the like by directly connecting a wiring to which an output voltage from the second battery 42BP is applied, to a power supply terminal of the communication controller 34 and the like, or the voltage serving as a power supply may be supplied to the drive controller 22 and the like by directly connecting a wiring to which an output voltage from the second electric power controller 42PC is applied, to a power supply terminal of the drive controller 22 and the like.

The power supply device 40 further includes the second circuit board 42PCB on which at least the second electric power controller 42PC, the communication controller 34, the position information acquisition portion 36, and the wireless communication device 32 are mounted. The second circuit board 42PCB is provided with a second connection portion 42CN (an example of a "second connector") for connecting to the first circuit board 41PCB via the cable 40CB.

As illustrated in FIG. 3, the first voltage line 41 to which the power supply voltage from the battery 10BP is applied not only supplies a voltage to the first electric power controller 41PC via the power supply switch 40S, but also supplies a voltage to the second power controller 42PC by including a wiring that is connected to the second electric power controller 42PC via the first connection portion 41CN of the first circuit board 41PCB, the cable 40CB, and the second connection portion 42CN of the second circuit board 42PCB.

Further, the second voltage line 42 to which the first operating voltage (3.3 V) generated by the first electric power controller 41PC is applied, includes a wiring connected to the second electric power controller 42PC and the communication controller 34 via the connection portion of the first circuit board 41PCB, the cable 40CB, and the connection portion of the second circuit board 42PCB. Accordingly, when the main battery 10BP is attached, the second voltage line 42 is configured to supply electric power (voltage and current) in a direction from the first electric power controller 41PC to the second electric power controller 42PC, and when the main battery 10BP is removed, the second voltage line 42 is configured to supply electric power (voltage and current) in a direction from the second electric power controller 42PC to the first electric power controller 41PC.

Here, the third wiring 41C of the first voltage line 41 provided on the second circuit board 42PCB is provided with a diode 40D (an example of a "backflow suppression circuit") having an anode connected to a first electric power controller 41PC side and a cathode connected to a second electric power controller 42PC side. The diode 40D serves as a circuit capable of permitting a current to flow from the first electric power controller 41PC to the second electric power controller 42PC and suppressing a current from flowing from the second electric power controller 42PC to the first electric power controller 41PC. The backflow suppression circuit may be provided in the second wiring 41B of the first voltage line 41 provided on the first circuit board 41PCB.

By providing the backflow suppression circuit, it is possible to suppress the flow from the second battery 42BP to the first electric power controller 41PC via the second electric power controller 42PC, and thus it is possible to effectively use the main battery 10BP and the second battery 42BP.

The second voltage line 42 is preferably configured to permit a current to flow from the first electric power controller 41PC (first voltage supply portion) to the second electric power controller 42PC (second voltage supply portion) and configured to permit a current to flow from the second electric power controller 42PC (second voltage supply portion) to the first electric power controller 41PC (first voltage supply portion).

With such a configuration, electric power (voltage) can be supplied to the power supply terminal of the drive controller 22 of the first circuit board 41PCB via the second voltage line 42 that connects the second circuit board 42PCB which is a communication board, the second connector, the first connector, and the first electric power controller 41PC.

Therefore, when the main battery 10BP is removed, the drive controller 22 can be operated. For example, the drive controller 22 can update firmware that is a control program. Accordingly, it is possible to reduce a situation where the work of a worker has to be interrupted for updating the firmware of the drive controller 22, thereby improving work efficiency.

The second voltage line 42 may be provided so as to connect the first connector and the power supply terminal of the drive controller 22 of the first circuit board 41PCB directly without using the first electric power controller 41PC as an intermediary.

[Arrangement Configuration of Circuit Board]

The power supply device 40 according to the present embodiment has a configuration in which the first circuit board 41PCB and the second circuit board 42PCB are connected to each other via the cable 40CB (including a wiring constituting a part of the first voltage line 41 and a wiring constituting a part of the second voltage line 42). Therefore, by increasing a length of the cable 40CB, the first circuit board 41PCB and the second circuit board 42PCB can be disposed at different positions.

Figure 4:
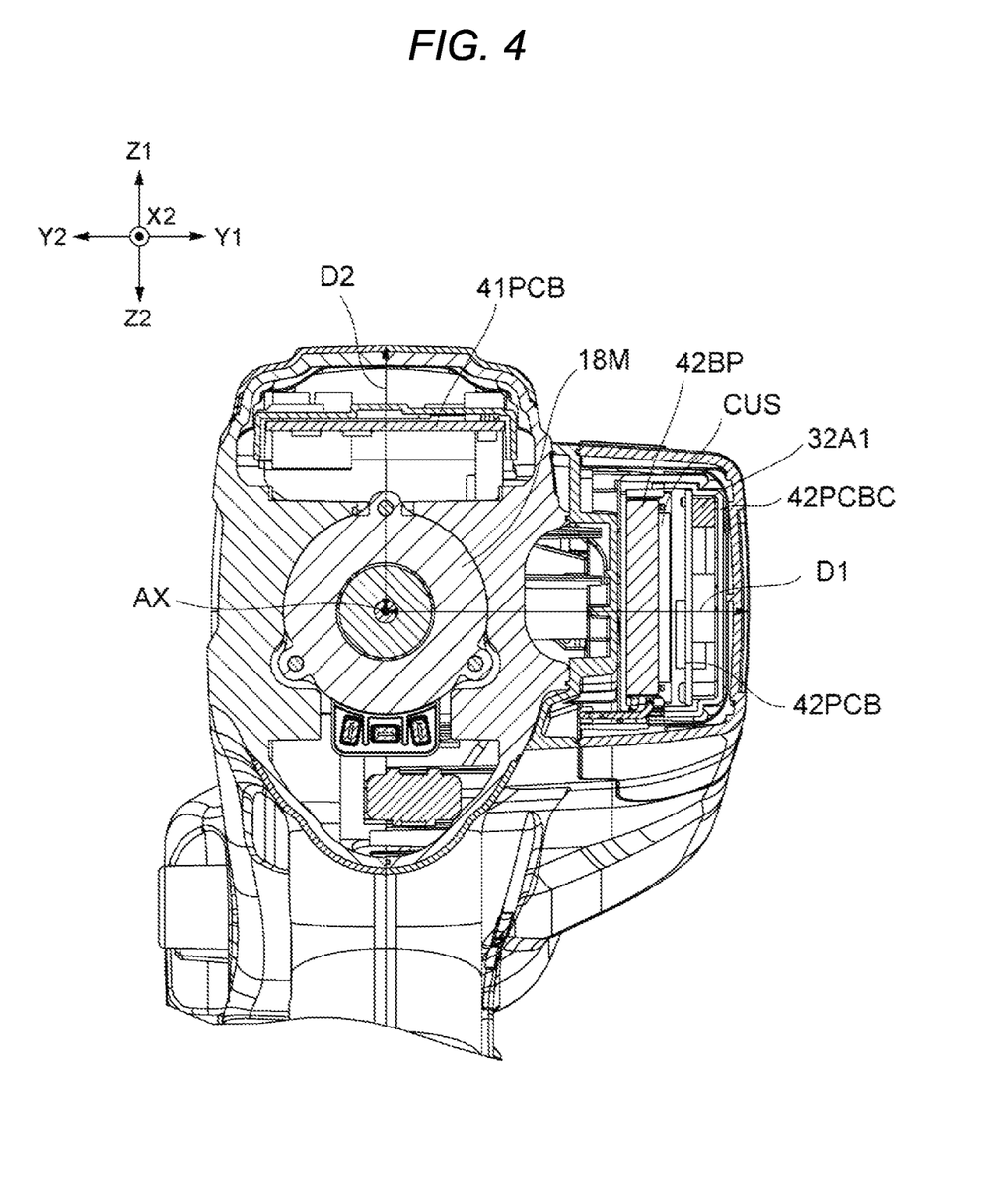
FIG. 4 is a cross-sectional view taken along a line C-C in FIG. 2.
Figure 5:
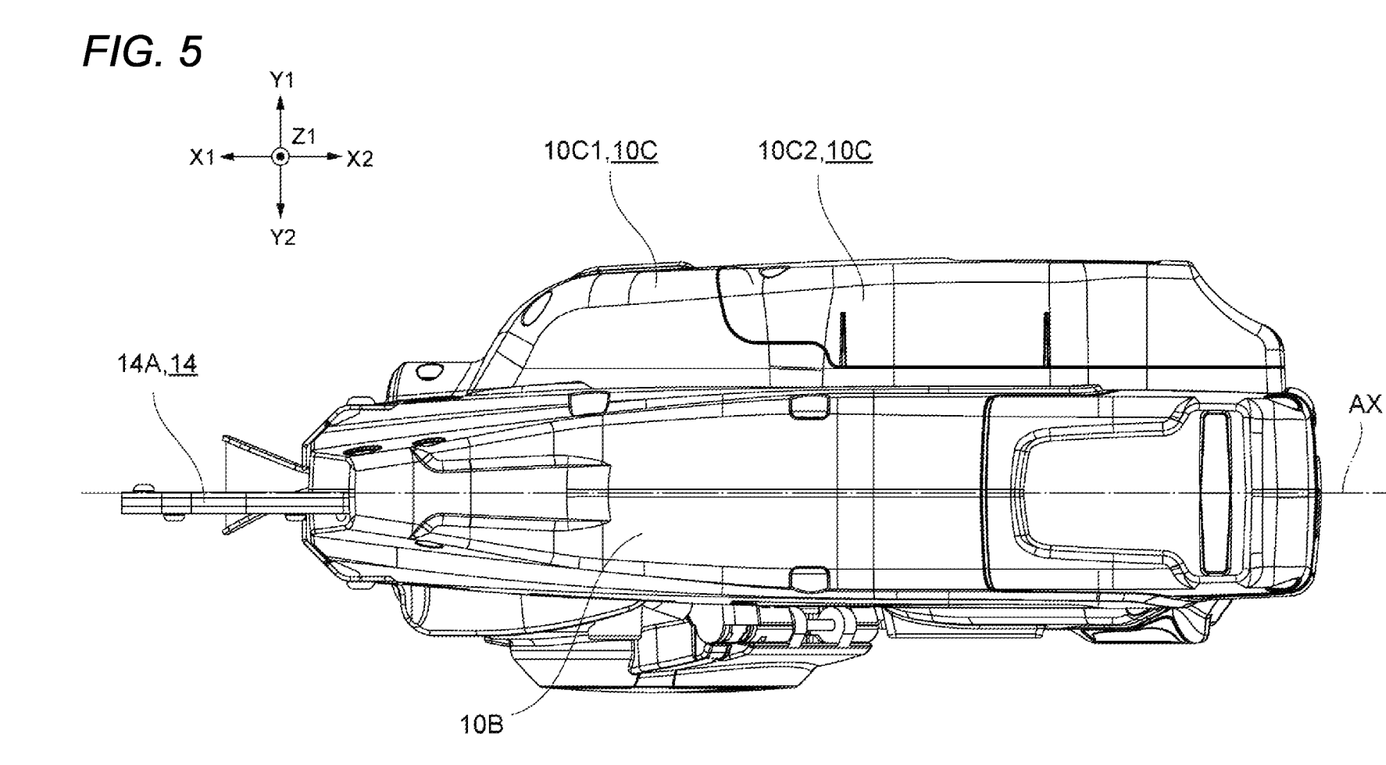
FIG. 5 is a plan view of the electric power tool according to the embodiment.
Figure 6:
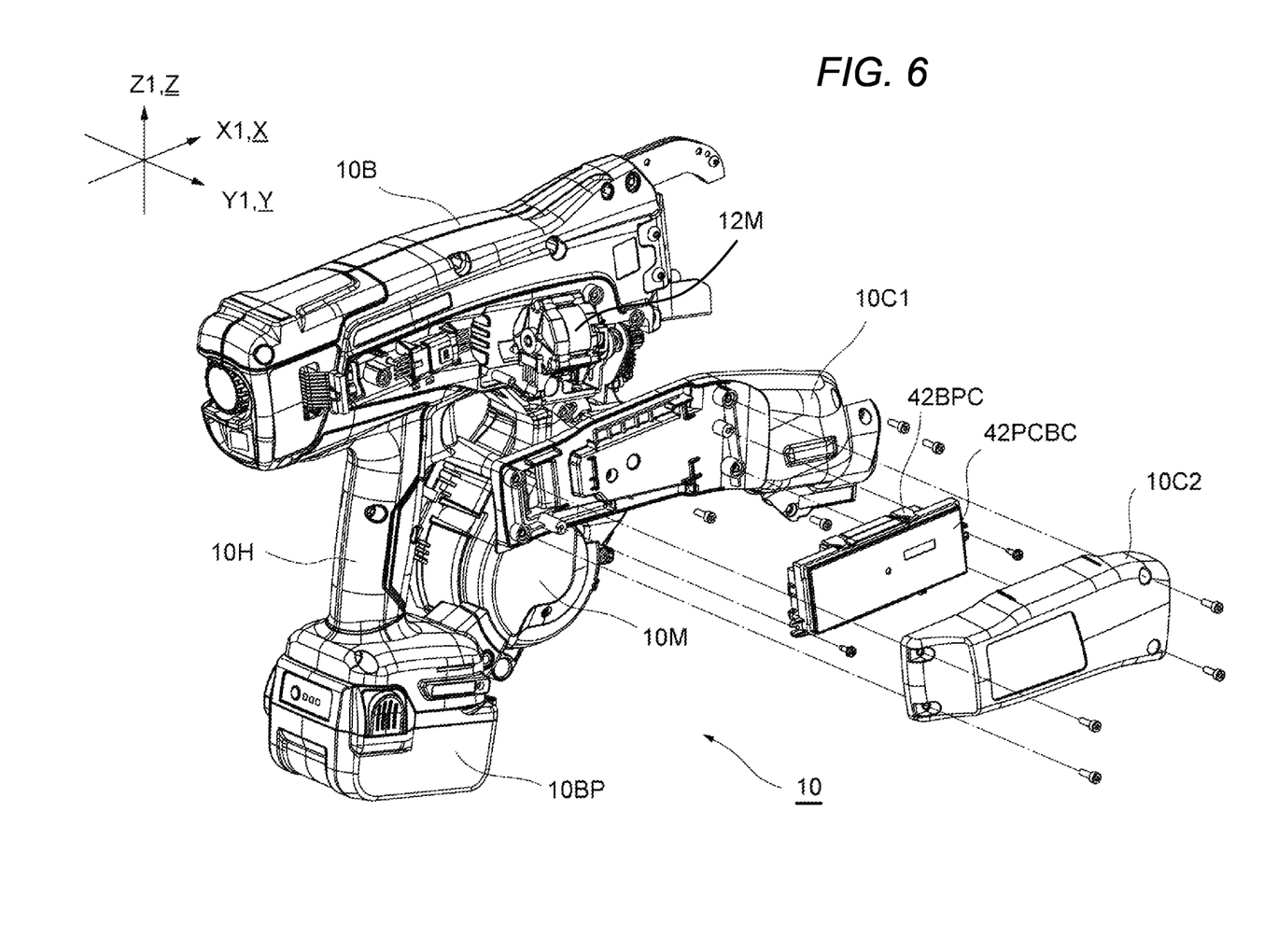
FIG. 6 is an exploded perspective view of the electric power tool according to the embodiment.
Figure 7:
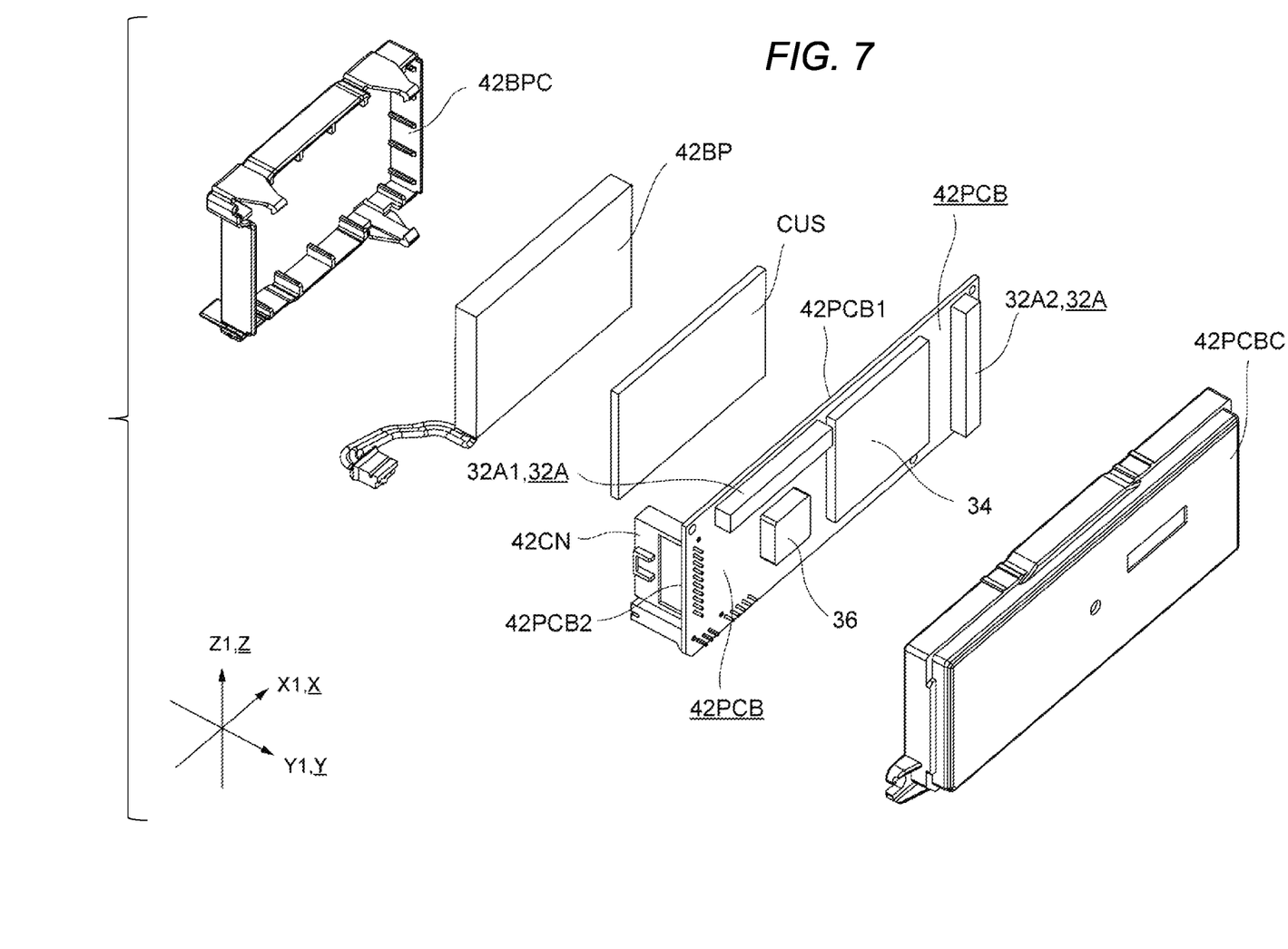
FIG. 7 is an exploded perspective view of a configuration including a circuit board on which a communication device of the electric power tool according to the embodiment is mounted.

FIG. 4 is a cross-sectional view taken along a line C-C in FIG. 2. FIG. 5 is a plan view of the reinforcing bar binding machine 10 as viewed from the upper side Z1. FIG. 6 is an exploded perspective view illustrating a method of assembling the second circuit board 42PCB of the reinforcing bar binding machine 10. FIG. 7 is an exploded perspective view illustrating a configuration including the second circuit board 42PCB and the communication controller 34 and the like mounted thereon.

As illustrated in FIG. 4, the first circuit board 41PCB and the second circuit board 42PCB of the power supply device 40 according to the present embodiment are disposed around at least one electric motor (the binding motor 18M in the present embodiment) of the two electric motors.

More specifically, the first circuit board 41PCB is disposed such that the circuit board is substantially perpendicular to the up-down direction Z (for example, at the upper side Z1) of the binding motor 18M in the up-down direction Z, in a cross section (FIG. 4) that is perpendicular to the rotation axis AX of the binding motor 18M and that passes through the binding motor 18M. On the other hand, the second circuit board 42PCB is disposed such that the circuit board is substantially perpendicular to the left-right direction Y (for example, at the right side Y1) of the binding motor 18M in the left-right direction Y, in the cross section (FIG. 4) that is perpendicular to the rotation axis AX of the binding motor 18M and that passes through the binding motor 18M.

With such a configuration, the two circuit boards can be disposed so as to surround the motor (one of the binding motor 18M and the feeding motor 12M) in a state of being substantially perpendicular to each other.

Therefore, a height of the electric power tool (reinforcing bar binding machine 10) in the up-down direction Z can be reduced. Further, noise of the motor can be reduced as compared with a case where the circuit boards are stacked.

Here, the electric power tool (reinforcing bar binding machine 10) is configured such that, in at least one cross section perpendicular to the rotation axis AX of the binding motor 18M, a distance D1 between the rotation axis AX and an outer surface of the housing 10C located at the right side Y1 (or the left side Y2) of the rotation axis AX, the second circuit board 42PCB being disposed between the rotation axis AX and this outer surface of the housing 10C, is larger than a distance D2 between the rotation axis AX and an outer surface of the housing 10C located at the upper side Z1 (or the lower side Z2) of the rotation axis AX, the first circuit board 41PCB being disposed between the rotation axis AX and this outer surface of the housing 10C.

With such a configuration, the height of the electric power tool (reinforcing bar binding machine 10) in the up-down direction Z can be reduced.

Here, in the cross section, the second circuit board 42PCB is disposed at an outer side with respect to a center of a line segment that connects the rotation axis AX and the outer surface of the housing 10C located at the right side Y1 (or the left side Y2) of the rotation axis AX, the second circuit board 42PCB being disposed between the rotation axis AX and the outer surface of the housing 10C. For example, the second circuit board 42PCB is disposed at an end in the left-right direction Y (in the present embodiment, an end portion at the right side Y1) in a region inside the housing 10C.

Therefore, the antenna 32A of the communication device 32 and the communication controller 34, which are mounted on the second circuit board 42PCB, are less likely to be affected by noise generated by the rotation of the feeding motor 12M and the binding motor 18M.

Similarly, in the cross section, the first circuit board 41PCB is disposed at an outer side with respect to a center of a line segment that connects the rotation axis AX and the outer surface of the housing 10C located at the upper side Z1 (or the lower side Z2) of the rotation axis AX, the first circuit board 41PCB being disposed between the rotation axis AX and the outer surface of the housing 10C. For example, the first circuit board 41PCB is disposed at an end in the up-down direction Z in a region inside the housing 10C.

Therefore, the drive controller 22 mounted on the first circuit board 41PCB is less likely to be affected by noise generated by the rotation of the feeding motor 12M and the binding motor 18M. The positions of the first circuit board 41PCB and the second circuit board 42PCB may be exchanged with each other. That is, the first circuit board 41PCB may be disposed in the left-right direction of the electric motor (for example, at an end on the right side Y1 or the left side Y2 of a region surrounded by the housing 10C), and the second circuit board 42PCB may be disposed in the up-down direction of the electric motor (for example, at an end on the upper side Z1 or the lower side Z2 of the region surrounded by the housing 10C).

However, it is preferable that the first circuit board 41PCB is disposed at the upper side Z1 of the region surrounded by the housing 10C. Since the first circuit board 41PCB is likely to be affected by heat generated by the electric motor, it is possible to relatively facilitate heat dissipation by disposing the first circuit board 41PCB at the upper side Z1 of the region surrounded by the housing 10C.

Further, in the present embodiment, the second circuit board 42PCB has a configuration in which a height in the up-down direction Z is intentionally reduced. Specifically, the second circuit board 42PCB is formed in a rectangular shape including a first edge 42PCB1 extending in the front-rear direction X and a second edge 42PCB2 extending in the up-down direction Z. As described above, the second circuit board 42PCB is substantially perpendicular to the left-right direction Y. In the present embodiment, a length of the first edge 42PCB1 (an example of a "first length") is two times or more the length of the second edge 42PCB2 (an example of a "second length"). In other words, the length of the second edge 42PCB2 is half or less of the length of the first edge 42PCB1.

In the present embodiment, the antenna 32A includes a first antenna 32A1 extending in the front-rear direction X and a second antenna 32A2 extending in the up-down direction Z. The communication controller 34 is disposed between the first antenna 32A1 and the second antenna 32A2. Here, a length of an edge of the communication controller 34 in the up-down direction Z is half or more of the length of the second edge 42PCB2.

In other words, based on the length of the edge of the communication controller 34 in the up-down direction Z, the length of the second edge 42PCB2 is two times or less than (preferably, 1.5 times or less than) the length of the edge of the communication controller 34 in the up-down direction Z. By determining the length of the second edge 42PCB2 of the second circuit board 42PCB in this manner, it is possible to reduce the height of the second circuit board 42PCB in the up-down direction Z and to reduce the height of the reinforcing bar binding machine 10 in the up-down direction Z.

In addition, of the two antennas (the first antenna 32A1 and the second antenna 32A2) extending in different directions, one antenna is disposed in a region at the front side X1 with respect to the communication controller 34 and the other is disposed in a region at the rear side X2 with respect to the communication controller 34, and thus it is possible to reduce a possibility that both antennas are affected by noise or the like. Moreover, since the first edge 42PCB1 of the second circuit board 42PCB is provided to be long, the first antenna 32A1 can also be provided to be long. A length of the first antenna 32A1 in the front-rear direction X may be longer than the length of the second edge 42PCB2.

Hereinafter, an implementation example of a configuration including the communication device 32 according to the present embodiment will be described with reference to FIG. 7. As described above, the second battery 42BP is integrally fixed to the second circuit board 42PCB on which the antenna 32A and the like are mounted. Specifically, the second battery 42BP is disposed substantially in parallel with the second circuit board 42PCB, at an inner side with respect to the second circuit board 42PCB (in the present embodiment, disposed at the left side Y2, at a position closer to the rotation axis AX than the second circuit board 42PCB). Therefore, the second battery 42BP can function as a shield. Accordingly, the antenna 32A of the communication device 32 and the like are less likely to be affected by noise generated by driving of the feeding motor 12M, the binding motor 18M, and the like.

In addition, the second circuit board 42PCB and the second battery 42BP arranged adjacent to each other in parallel are sandwiched between a circuit board cover 42PCBC, which surrounds and protects the second circuit board 42PCB, and a battery cover 42BPC. By being sandwiched between the two covers in this manner, the communication portion 30 can be unitized (FIG. 6). Therefore, a configuration related to a motor portion of the electric power tool having no communication function and a configuration related to the motor portion of the electric power tool having the communication function can be made as one.

Further, a plate-shaped buffer member CUS is inserted between the second circuit board 42PCB and the second battery 42BP. By inserting the buffer member CUS, even if the second battery 42BP thermally expands, it is possible to suppress the second battery 42BP from warping the second circuit board 42BPC that is long in a lateral direction by abutting on the second circuit board 42PCB. In addition, by inserting the buffer member CUS, it is possible to suppress the second battery 42BP in the unit from moving accompanying the work and to position the second battery 42BP.

As illustrated in FIGS. 6 and 7, the second circuit board 42PCB on which the antenna 32A and the communication controller 34 are mounted as described above is disposed at a position apart from the feeding motor 12M at the rear side X2. For example, the second circuit board 42PCB may be disposed at the rear side X2 of the feeding motor 12M such that the second circuit board 42PCB and a region through which the rotor of the feeding motor 12M passes overlap partially with each other when projected in the front-rear direction X.

In order to implement such an arrangement, the housing 10C includes a motor cover 10C1 (an example of a "first housing portion") that covers at least a part of the feeding motor 12M, and a second housing portion 10C2 that accommodates, between the motor cover 10C1 and the second housing portion 10C2, the second circuit board 42PCB and the antenna 32A and the communication controller 34 mounted thereon.

Since the motor cover 10C1 has a configuration in which a front-side X1 portion of an outer surface (a surface facing the right side Y1 in the present embodiment) protrudes to an outer side (the right side Y1 in the present embodiment), the motor cover 10C1 can accommodate at least a part of the feeding motor 12M therein. On the other hand, since the motor cover 10C1 has a configuration in which a rear-side X2 portion is recessed to an inner side (the left side Y2 in the present embodiment) compared to the front-side X1 portion, the second circuit board 42PCB can be disposed in a region that is located between the rear-side X2 portion of the motor cover 10C1 and the second housing portion 10C2 and at the rear side X2 of the feeding motor 12M. Accordingly, at least a part of the motor cover 10C1 is disposed between the feeding motor 12M and the second circuit board 42PCB and the communication device 32.

The second circuit board 42PCB may be provided with the circuit board cover 42PCBC that surrounds and protects the second circuit board 42PCB.

As described above, according to the electric power tool of the present embodiment, since the communication device is not mounted on the battery, the weight of the battery can be reduced. In addition, since two separate circuit boards are used and the two circuit boards are disposed around the electric motor, the height of the electric power tool can be reduced even though the wireless communication device and the plurality of electric motors are mounted. In addition, since at least one of the circuit boards is disposed in a space behind one of the two electric motors, it is also possible to suppress an increase in size of the electric power tool in the left-right direction.

Various modifications can be made without departing from the gist of the present invention. For example, a positional relationship between the first circuit board 41PCB and the second circuit board 42PCB may be changed by exchanging positions thereof as described above. Further, at least one of the circuit boards may be mounted to be inclined with respect to the up-down direction Z. It is possible to add other known techniques to a part of the constituent elements of an embodiment within the scope of the ordinary creativity of those skilled in the art. A part of constituent elements of an embodiment may be replaced with other known techniques. For example, the drive controller and the communication controller can operate at different voltages.

What is claimed is:

1. An electric power tool comprising:
   a first electric motor and a second electric motor;
   a first controller configured to control the first electric motor and the second electric motor;
   a first circuit board on which the first controller is mounted;
   a communication device;
   a second controller configured to control the communication device;
   a second circuit board on which the second controller and an antenna of the communication device are mounted; and
   a housing configured to accommodate the first electric motor, the second electric motor, the first circuit board, the communication device, and the second circuit board,
   wherein the first circuit board and the second circuit board are disposed around the first electric motor,
   wherein the electric power tool is configured such that a first battery can be detachably attached thereto,
   wherein the electric power tool further comprises a second battery, and
   wherein the second battery is disposed at a position closer to a rotation axis of the first electric motor than the second circuit board.

2. The electric power tool according to claim 1, wherein the first circuit board or the second circuit board includes
   a first edge extending in a first direction, and
   a second edge extending in a second direction perpendicular to the first direction, and
   the second circuit board is disposed at an end in a third direction perpendicular to the first direction and the second direction in a region inside the housing.

3. The electric power tool according to claim 2, wherein the antenna includes
   a first antenna extending in the first direction, and
   a second antenna extending in the second direction perpendicular to the first direction.

4. The electric power tool according to claim 2, further comprising:
   a magazine configured to accommodate a wire,
   wherein the first electric motor is configured to drive a binding portion that is configured to bind the wire,
   the second electric motor is configured to feed the wire outward from a front end in the first direction, and
   the electric power tool is a reinforcing bar binding machine configured to bind reinforcing bars by using the wire.

5. The electric power tool according to claim 2, wherein the first circuit board is disposed substantially perpendicular to the second direction, and
   the second circuit board is disposed substantially perpendicular to the third direction.

6. The electric power tool according to claim 2, wherein the first circuit board or the second circuit board is disposed at a position apart from the second electric motor at a rear side in the first direction.

7. The electric power tool according to claim 1, wherein the housing includes
   a first housing portion configured to cover at least a part of the second electric motor, and having at least a part disposed between the second electric motor, and the communication device and the second circuit board, and
   a second housing portion configured to accommodate the communication device and the second circuit board in a region between the first housing portion and the second housing portion.

8. The electric power tool according to claim 1, wherein the second circuit board is disposed substantially perpendicular to a third direction, the third direction being perpendicular to a first direction and a second direction perpendicular to the first direction, and includes a first edge having a first length in the first direction and a second edge having a second length in the second direction at half or less of the first length,
   the second controller has at least one edge having a length at half or more of the second length, and
   at least a part of the antenna is disposed at a position apart from the second controller at a rear side in the first direction.

9. The electric power tool according to claim 1, wherein the first circuit board and the second circuit board are disposed around the first electric motor in a cross section that is perpendicular to a rotation axis of the first electric motor and that passes through the first electric motor.

10. The electric power tool according to claim 1, wherein the first circuit board is disposed at an upper side of a region surrounded by the housing.

11. The electric power tool according to claim 1, wherein the second battery is detachably provided with respect to the second circuit board.

12. The electric power tool according to claim 1, wherein the housing constitutes a main body of the electric power tool, and a magazine is provided extending from a lower portion of the main body at a front side to a lower side.

* * * * *